(12) United States Patent
Stimm et al.

(10) Patent No.: US 12,470,805 B2
(45) Date of Patent: *Nov. 11, 2025

(54) SYSTEMS AND METHODS FOR PRESENTING MULTIPLE VIEWS OF VIDEOS

(71) Applicant: GoPro, Inc., San Mateo, CA (US)

(72) Inventors: Daryl Stimm, Encinitas, CA (US); Evan Kosowski, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/799,776

(22) Filed: Aug. 9, 2024

(65) Prior Publication Data

US 2024/0406537 A1 Dec. 5, 2024

Related U.S. Application Data

(63) Continuation of application No. 17/986,370, filed on Nov. 14, 2022, now Pat. No. 12,063,431.

(51) Int. Cl.
*G06T 7/20* (2017.01)
*H04N 5/04* (2006.01)
*H04N 5/262* (2006.01)
*H04N 23/62* (2023.01)

(52) U.S. Cl.
CPC ............... *H04N 23/62* (2023.01); *G06T 7/20* (2013.01); *H04N 5/04* (2013.01); *H04N 5/2628* (2013.01); *G06T 2200/24* (2013.01)

(58) Field of Classification Search
CPC ........................................................ G06T 7/20
See application file for complete search history.

(56) References Cited

U.S. PATENT DOCUMENTS 12,063,431 B1 8/2024 Stimm
2012/0071710 A1 3/2012 Gazdzinski

*Primary Examiner* — Y Lee
(74) *Attorney, Agent, or Firm* — Esplin & Associates, PC

(57) ABSTRACT

Multiple sets of framing for a video may define different positioning of multiple viewing windows for a video. The multiple viewing windows may be used to provide different punchouts of the video within a graphical user interface. The graphical user interface may enable creation/change in the sets of framing for the video. The graphical user interface for the punchouts may include a single timeline representation for the video. Framing indicators that represent different sets of framing for the video may be presented along the single timeline representation at different times.

20 Claims, 6 Drawing Sheets

SYSTEMS AND METHODS FOR PRESENTING MULTIPLE VIEWS OF VIDEOS

FIELD

This disclosure relates to presenting multiple vides of videos.

BACKGROUND

A video may have a wide field of view (e.g., spherical field of view). The wide field of view of the video may make it difficult to see different spatial parts of the video at the same time.

SUMMARY

This disclosure relates to presenting multiple views of videos. Video information, multi-framing information, and/or other information may be obtained. The video information may define a video. The video may have a progress length. The video may include visual content viewable as a function of progress through the progress length. The multi-framing information for the video may define multiple sets of framing of the visual content for multiple viewing windows. Separate sets of framing may determine positioning of separate viewing windows for the visual content. The multiple sets of framing may include a first set of framing, a second set of framing, and/or other sets of framing. The first set of framing may determine positioning of a first viewing window for the visual content, the second set of framing may determine positioning of a second viewing window for the visual content, and/or other sets of framing may determine positioning of other viewing widows for the visual content.

Presentation of a graphical user interface on one or more electronic displays may be effectuated. The graphical user interface may include presentation of one or more of the multiple viewing windows as one or more punchouts of the visual content. The graphical user interface may include a single timeline representation of the progress length of the video. Framing indicators representing different sets of framing may be presented along the single timeline representation at different times.

A system for presenting multiple views of videos may include one or more electronic storage, processor, and/or other components. The electronic storage may store video information, information relating to a video, multi-framing information, information relating to framing of visual content, information relating to positioning of viewing windows, information relating to a graphical user interface, and/or other information.

The processor(s) may be configured by machine-readable instructions. Executing the machine-readable instructions may cause the processor(s) to facilitate presenting multiple views of videos. The machine-readable instructions may include one or more computer program components. The computer program components may include one or more of a video component, a multi-framing component, a graphical user interface component, and/or other computer program components.

The video component may be configured to obtain video information and/or other information. The video information may define a video. The video may have a progress length. The video may include visual content viewable as a function of progress through the progress length.

The multi-framing component may be configured to obtain multi-framing information for the video and/or other information. The multi-framing information for the video may define multiple sets of framing of the visual content for multiple viewing windows. Separate sets of framing may determine positioning of separate viewing windows for the visual content. The multiple sets of framing may include a first set of framing, a second set of framing, and/or other sets of framing. The first set of framing may determine positioning of a first viewing window for the visual content, the second set of framing may determine positioning of a second viewing window for the visual content, and/or other sets of framing may determine positioning of other viewing widows for the visual content.

The graphical user interface component may be configured to effectuate presentation of a graphical user interface on one or more electronic displays. The graphical user interface may include presentation of one or more of the multiple viewing windows as one or more punchouts of the visual content. The graphical user interface may include a single timeline representation of the progress length of the video. Framing indicators representing different sets of framing may be presented along the single timeline representation at different times.

In some implementations, the punchout(s) of the visual content may be selectable within the graphical user interface. The framing indicators may represent a single set of framing for a selected punchout of the visual content.

In some implementations, the punchout(s) of the visual content may include a single full-view punchout of the visual content, one or more mini-view punchouts of the visual content, and/or other punchouts of the visual content. Size, shape, and/or position of the mini-view punchout(s) of the visual content may be adjustable within the graphical user interface.

In some implementations, individual sets of framing of the visual content may be independent of each other such that the second set of framing is independent of the first set of framing. In some implementations, at least one set of framing may be dependent on another set of framing such that the second set of framing is dependent on the first set of framing.

In some implementations, positioning of an individual viewing window for the visual content may be changed. The positioning of an individual viewing window for the visual content may be changed based on movement of the visual content within a corresponding punchout of the visual content within the graphical user interface and/or other information.

In some implementations, the positioning of separate viewing windows for the visual content may be exportable as separate framing tracks for the visual content.

In some implementations, playback of multiple punchouts of the visual content may be automatically synchronized based on use of the video as a single video source.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
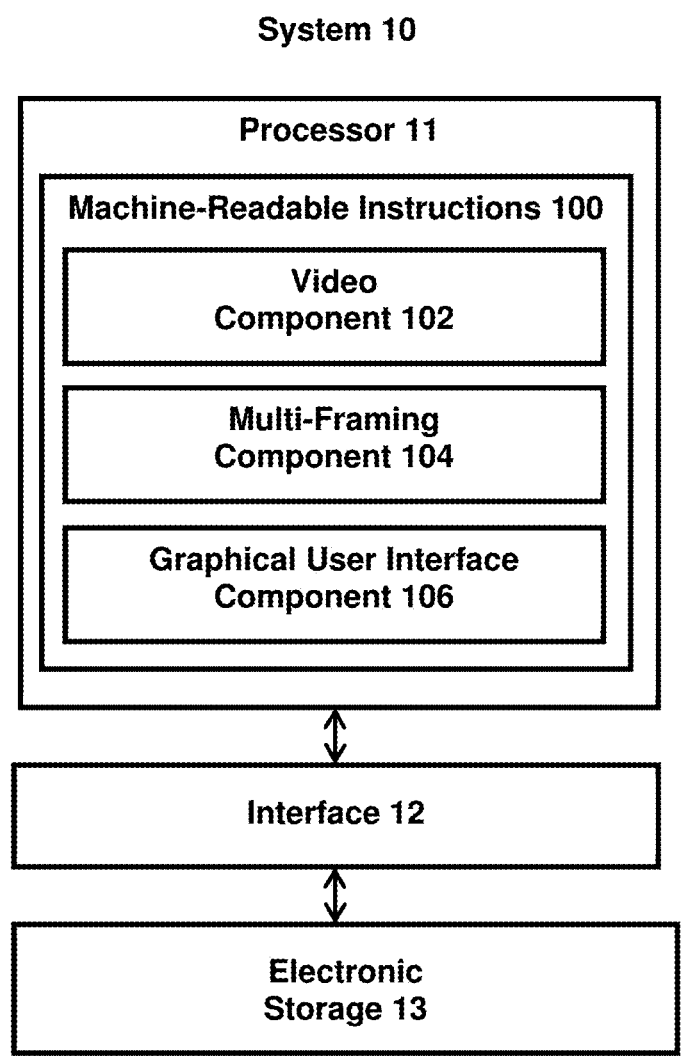
FIG. 1 illustrates a system for presenting multiple views of videos.

FIG. 1 illustrates a system 10 for presenting multiple views of videos. The system 10 may include one or more of a processor 11, an interface 12 (e.g., bus, wireless interface), an electronic storage 13, and/or other components. Video information, multi-framing information, and/or other information may be obtained by the processor 11. The video information may define a video. The video may have a progress length. The video may include visual content viewable as a function of progress through the progress length. The multi-framing information for the video may define multiple sets of framing of the visual content for multiple viewing windows. Separate sets of framing may determine positioning of separate viewing windows for the visual content. The multiple sets of framing may include a first set of framing, a second set of framing, and/or other sets of framing. The first set of framing may determine positioning of a first viewing window for the visual content, the second set of framing may determine positioning of a second viewing window for the visual content, and/or other sets of framing may determine positioning of other viewing widows for the visual content.

Presentation of a graphical user interface on one or more electronic displays may be effectuated by the processor 11. The graphical user interface may include presentation of one or more of the multiple viewing windows as one or more punchouts of the visual content. The graphical user interface may include a single timeline representation of the progress length of the video. Framing indicators representing different sets of framing may be presented along the single timeline representation at different times.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to a video, multi-framing information, information relating to framing of visual content, information relating to positioning of viewing windows, information relating to a graphical user interface, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting multiple views of videos. The machine-readable instructions 100 may include one or more computer program components. The machine-readable instructions 100 may include one or more of a video component 102, a multi-framing component 104, a graphical user interface component 106, and/or other computer program components.

The video component 102 may be configured to obtain video information and/or other information. Obtaining video information may include one or more of accessing, acquiring, analyzing, capturing, determining, examining, generating, identifying, loading, locating, opening, receiving, retrieving, reviewing, selecting, storing, and/or otherwise obtaining the video information. The video component 102 may obtain video information from one or more locations. For example, the video component 102 may obtain video information from a storage location, such as the electronic storage 13, electronic storage of information and/or signals generated by one or more sensors, electronic storage of a device accessible via a network, and/or other locations. The video component 102 may obtain video information from one or more hardware components (e.g., an image sensor, a processor) and/or one or more software components (e.g., software running on a computing device).

In some implementations, the video component 102 may obtain video information based on user interaction with a user interface/application (e.g., video editing application, video player application), and/or other information. For example, a user interface/application may provide option(s) for a user to play and/or edit videos. The video information for a video may be obtained based on the user's selection of the video through the user interface/video application. Other selections of a video for retrieval of video information are contemplated.

The video information may define a video. A video may have a progress length. The progress length of a video may be defined in terms of time durations and/or frame numbers. For example, a video may have a time duration of 60 seconds. A video may have 1800 video frames. A video having 1800 video frames may have a play time duration of 60 seconds when viewed at 30 frames per second. Other progress lengths, time durations, and frame numbers of videos are contemplated.

A video may have a field of view. A field of view of a video may refer to a field of view of a scene captured within the video (e.g., within video frames). A field of view of a video may refer to the extent of a scene that is captured within the video. In some implementations, the field of view of a video may be greater than or equal to 180-degrees. In some implementations, the field of view of a video may be smaller than or equal to 180-degrees.

In some implementations, a video may include a wide field of view video. A wide field of view video may refer to a video with a wide field of view. A wide field of view may refer to a field of view that is larger/wider than a threshold field of view/angle. For example, a wide field of view may refer to a field of view that is larger/wider than 60-degrees. In some implementations, a wide field of view video may include a spherical video having a spherical field of view. Spherical field of view may include 360-degrees of capture. Spherical field of view may include views in all directions surrounding the image capture device. Other fields of view of videos are contemplated. A wide field of view video may include and/or may be associated with spatial audio.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Content of one or more videos may be referred to as video content. Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the video progress length of the video content. A video frame may include an image of the video content at a moment within the video progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content may be stored in one or more formats and/or one or more containers. Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

Video information may be stored within a single file or multiple files. For example, video information defining a video may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The multi-framing component 104 may be configured to obtain multi-framing information for the video and/or other information. Obtaining multi-framing information may include one or more of accessing, acquiring, analyzing, determining, examining, identifying, loading, locating, opening, receiving, retrieving, reviewing, storing, and/or otherwise obtaining the multi-framing information. The multi-framing component 104 may obtain multi-framing information from one or more locations. For example, the multi-framing component 104 may obtain multi-framing information from a storage location, such as the electronic storage 13, electronic storage of a device accessible via a network, and/or other locations. The multi-framing component 104 may obtain multi-framing information from one or more hardware components (e.g., computing device, electronic storage) and/or one or more software components (e.g., software running on a computing device). Multi-framing information may be stored within a single file or multiple files.

In some implementations, the multi-framing component 104 may obtain multi-framing information for the video based on a user's interaction with a user interface/application (e.g., video editing application, video player application), and/or other information. The user interface/application may provide option(s) for a user to set and/or define different sets of framing of the visual content. For example, the user interface/application may enable the user to select individual moments within the progress length to specify a framing of the visual content, and enable the user to set one or more of the viewing direction, the viewing size, the viewing rotation, the viewing projection, and/or other information to define the individual framing of the visual content at the selected moments.

In some implementation, the multi-framing component 104 may obtain multi-framing information based on the video information and/or the video component 102 obtaining the video information. For example, the multi-framing information may be associated with the video/video information obtained by the video component 102, and the multi-framing component 104 may obtain the associated multi-framing information based on obtaining of the video information. The multi-framing information may be included within metadata of the obtained video, and the multi-framing information may be obtained based on obtaining (e.g., selection, retrieval) of the video. The multi-framing information may be included within the video information, and the multi-framing component 104 may obtain multi-framing information by extracting the multi-framing information from the video information.

In some implementations, the multi-framing component 104 may obtain multi-framing information based on analysis of the video information and/or the video defined by the video information. For example, visual content detection (e.g., object detection, scene detection, activity detection) and/or audio content detection (e.g., sound detection, speech detection, command detection, cheering detection) may be performed and the multiple sets of framing of the visual content (e.g., number of framing; locations of the framing within the progress length; viewing directions, viewing sizes, viewing rotations, and/or viewing projections of framing) may be determined based on the results of the visual content detection (e.g., object, scene, and/or activity detected within the visual content) and/or the audio content detection (e.g., sound, speech, command, and/or cheering detected within the visual content). That is, content analysis of the video content may be used to automatically determine multiple sets of framing of the visual content.

In some implementations, the multi-framing component 104 may obtain multi-framing information based user input (e.g., user interaction with a graphical user interface). The user input may specify framing of visual content for different viewing windows. For example, the user input may specify one or more of the viewing direction, the viewing size, the viewing rotation, the viewing projection, and/or other information to define framing of the visual content at one or more moments for different viewing windows.

A viewing direction may define a direction of view for a viewing window. A viewing direction may define the angle/visual portion of the visual content at which the viewing window may be directed. A viewing size may define a size of the viewing window. A viewing size may define a size (e.g., size, magnification, viewing angle) of viewable extents of visual content within the video content. A viewing size may define the dimension/shape of the viewing window. A viewing rotation may define a rotation of the viewing window. A viewing rotation may define one or more rotations of the viewing window about one or more axis. A viewing projection may define how pixels within the viewing window is arranged for presentation on an electronic display. A viewing projection may define how the pixels of an image are arranged to form the visual content. A viewing projection may refer to how portions of the visual content/pixels are mapped onto a two-dimensional plane (e.g., two-dimensional image).

The multi-framing information for the video may define multiple sets of framing of the visual content for multiple viewing windows. A set of framing of the visual content may include one or more particular framing of the visual content for one or more moments within the progress length of the video. A set of framing of the visual content may determine positioning of a viewing window for the visual content. Separate sets of framing may determine positioning of separate viewing windows for the visual content. That is, different sets of framing of the visual content may correspond to different viewing windows, and different sets of framing of the visual content may determine positioning of different viewing windows for the visual content. For example, the multiple sets of framing may include a first set of framing, a second set of framing, and/or other sets of framing. The first set of framing may determine positioning of a first viewing window for the visual content, the second set of framing may determine positioning of a second viewing window for the visual content, and/or other sets of framing may determine positioning of other viewing widows for the visual content.

An individual framing of the visual content may determine positioning of a viewing window within the field of view of the visual content at a moment within the progress length. A viewing window may define extents of the visual content to be included within a presentation of the video content. A viewing window may define extents of the visual content to be included within a punchout of the visual content. A punchout of visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial parts of the visual content.

A punchout of visual content may include output of a virtual camera. A virtual camera may define one or more spatial extents of the visual content to be output (e.g., for presentation, for storage) based on orientation of the virtual camera with respect to the visual content of the video. A virtual camera may represent the point of view from which different spatial extents of the visual content are observed. Different punchouts of the visual content may include outputs of different virtual cameras to provide views of differential spatial parts of the visual content. In some implementations, spatial extents of a single video included within different punchouts may be treated as different videos. For example, spatial extents of a single video included within different punchouts may be represented, defined, stored, manipulated, and/or otherwise interactable within different video tracks.

Positioning of a viewing window within the field of view of the visual content may refer to placement of the viewing window within the field of view of the visual content. The positioning/placement of the viewing window may be defined by one or more of viewing direction, viewing size, viewing rotation, and/or other information. An individual framing of the visual content may define arrangement of pixels within the viewing window for presentation. The arrangement of the pixels within the viewing window may be defined by viewing projection and/or other information.

A set of framing of the visual content may include different framing of the visual content at different moments within the progress length. A moment within the progress length may include a point (e.g., a point in time, a video frame) or a duration (e.g., a duration of time, a grouping of adjacent video frames) within the progress length. Individual framing of the visual content may determine (e.g., define, establish, include, set) positioning of the viewing window within the field of view of the visual content based on the corresponding viewing direction, viewing size, viewing rotation, and/or other information. Individual framing of the visual content may further determine corresponding viewing projection of the visual content within the viewing window.

The multi-framing information may define a set of framing of the visual content for a viewing window by including information that defines one or more content, qualities, attributes, features, and/or other aspects of the set of framing/viewing window. For example, the multi-framing information may define a set of framing of the visual content for a viewing window by including information that specifies positioning of the viewing window for different moments within the progress length of the video. The multi-framing information may define a set of framing of the visual content for a viewing window by including information from which the positioning of the viewing window for different moments within the progress length of the video is determined. Other types of multi-framing information are contemplated.

The graphical user interface component 106 may be configured to effectuate presentation of one or more graphical user interfaces on one or more electronic displays. Effectuating presentation of a graphical user interface on an electronic display may include causing, bringing about, facilitating, and/or otherwise effectuating presentation of the graphical user interface on the electronic display. An electronic display may refer to an electronic device that provides visual presentation of information. An electronic display may be configured to present visual content, graphical user interface(s), and/or other information. In some implementations, an electronic display may include a touchscreen display. A touchscreen display may be configured to receive user input via a user's engagement with the touchscreen display. A user may engage with the touchscreen display via interaction with one or more touch-sensitive surfaces/screens and/or other components of the touchscreen display. An electronic display may be a standalone device or a component of a computing device, such as an electronic display of a mobile device (e.g., camera, smartphone, smartwatch, tablet, laptop) or a desktop device (e.g., monitor). User interaction with elements of the graphical user interface(s) may be received through the electronic display (e.g., touchscreen display) and/or other user interface devices (e.g., keyboard, mouse, trackpad).

A graphical user interface may refer to a user interface that enables a user to interact with the system 10 through one or more interface elements. A graphical user interface may refer to a user interface that enables the system 10 to provide information to a user through one or more interface elements. A graphical user interface may include interface elements. A graphical user interface may be static or dynamic. A graphical user interface may include a static configuration of interface elements and/or include dynamic configurations of interface elements that changes (e.g., with time, based on user interaction with one or more interface elements). Multiple/different interface elements may be presented/included within a graphical user interface at the same time, may be presented/included within a graphical user interface at different times, and/or may be presented/included within a graphical user interface responsive to user interaction with one or more other interface elements and/or other information.

An interface element of a graphical user interface may refer to a graphical element of the graphical user interface, such as window, icon, button, graphic, and/or other visual indicator. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., touchscreen display, keyboard, mouse, trackpad) and/or other user input. For example, a graphical user interface may present/include the interface elements in a particular arrangement and enable the user to interact with individual interface elements by engaging with locations corresponding to the individual interface elements on a touchscreen display.

A graphical user interface may include presentation of one or more of the multiple viewing windows as one or more punchouts of the visual content. One or more punchouts of the visual content may be included within the graphical user interface to provide views of one or more different spatial parts of the visual content. The graphical user interface may include a single punchout of the visual content or multiple punchouts of the visual content at the same time. The number of punchouts included in the graphical user interface may be static or dynamic. For example, the number of punchouts included in the graphical user interface may change during presentation of the visual content of the video. The locations of the punchouts included in the graphical user interface may be static or dynamic. For example, a particular punchout may always be presented at a particular location within the graphical user interface, or the location of the particular punchout may change during presentation of the visual content of the video.

The graphical user interface may include a single timeline representation of the progress length of the video. Even when multiple punchouts of the visual content are included within the graphical user interface, only a single timeline representation of the progress length may be included. Rather than including separate timeline representations for separate punchouts, a single timeline representation may be presented for all punchouts.

The graphical user interface may include framing indicators. The framing indicators may represent the multiple sets of framing. The framing indicators may visually represent the multiple sets of framing. The framing indicators may visually convey information relating to the multiple sets of framing. For example, the framing indicators may visually convey information on timing of different framing-when particular framing have been set within the progress length of the video. The framing indicators may visually convey information on positioning of a viewing window for different framing. The framing indicators may visually convey information on changes in positioning of a viewing window within the progress length of the video (e.g., change in positioning of a viewing window between two different, surrounding framing).

Framing indicators may be presented along the single timeline representation of the progress length of the video. The framing indicators may be presented next to and/or within the single timeline representation. The location of the framing indicators along the single timeline representation may indicate timing of different framing.

Framing indicators representing different sets of framing may be presented along the single timeline representation at different times. That is, framing indicators for framing of different viewing windows/punchouts may be presented along the single timeline representation at different times. Framing indicators for only a single set of framing (for a single viewing window/punchout) may be presented along the single timeline representation at any given time. Framing indicators for different sets of framing (for different viewing windows/punchouts) may not be presented along the single timeline representation at the same time.

In some implementations, the punchout(s) of the visual content may be selectable within the graphical user interface. For example, a user may interaction (e.g., click on, touch) a punchout of the visual content within the graphical user interface to select the punchout. The framing indicators presented along the single timeline representation may represent a single set of framing for the selected punchout of the visual content. Framing indicators may be presented along the single timeline representation for the punchout (viewing window) that has been selected. Graphical user interface may include different framing indicators based on which of the punchouts/viewing windows has been selected.

Figure 3A:
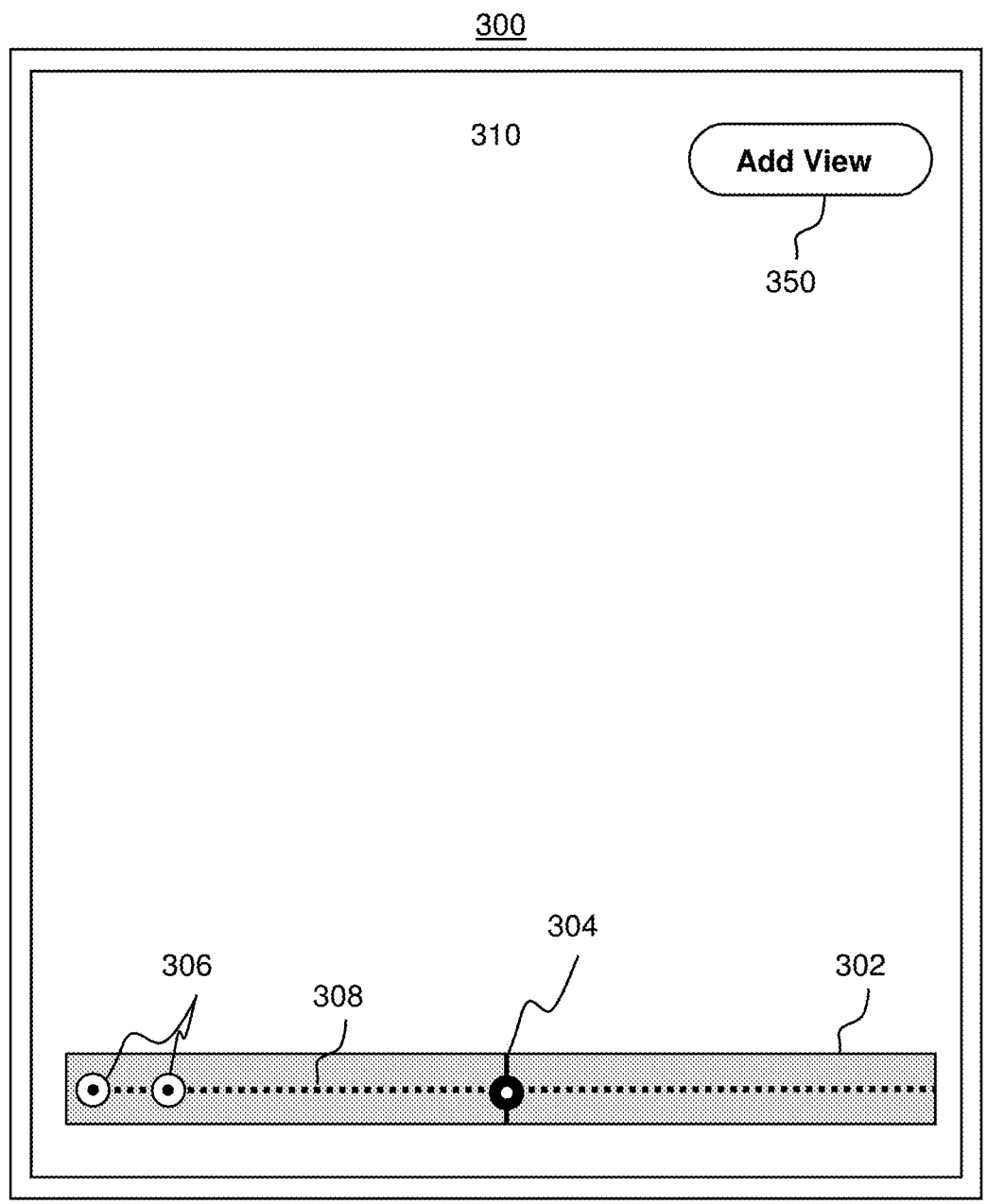
FIG. 3A illustrates an example view of a graphical user interface.
Figure 3B:
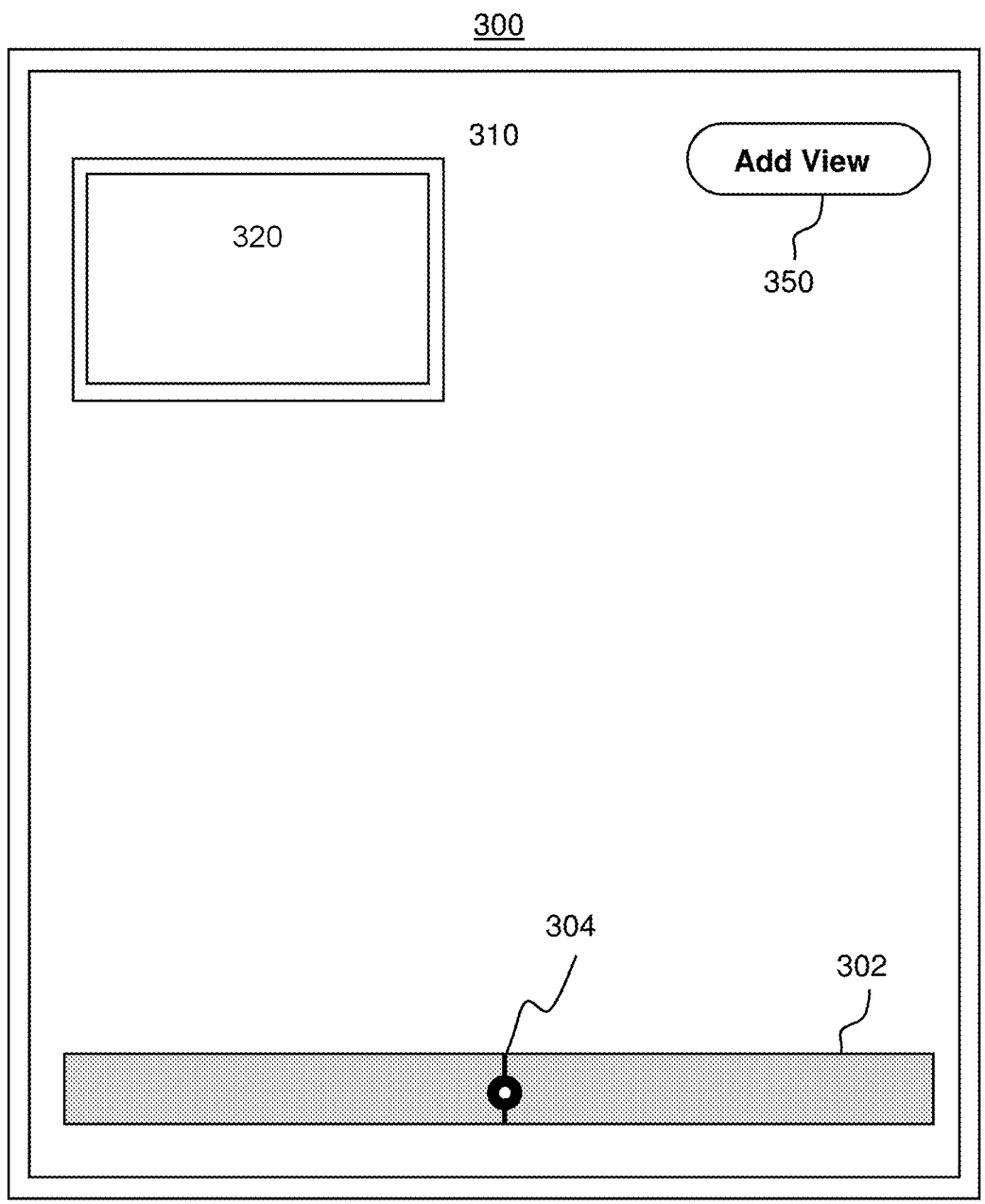
FIG. 3B illustrates an example view of a graphical user interface.
Figure 3C:
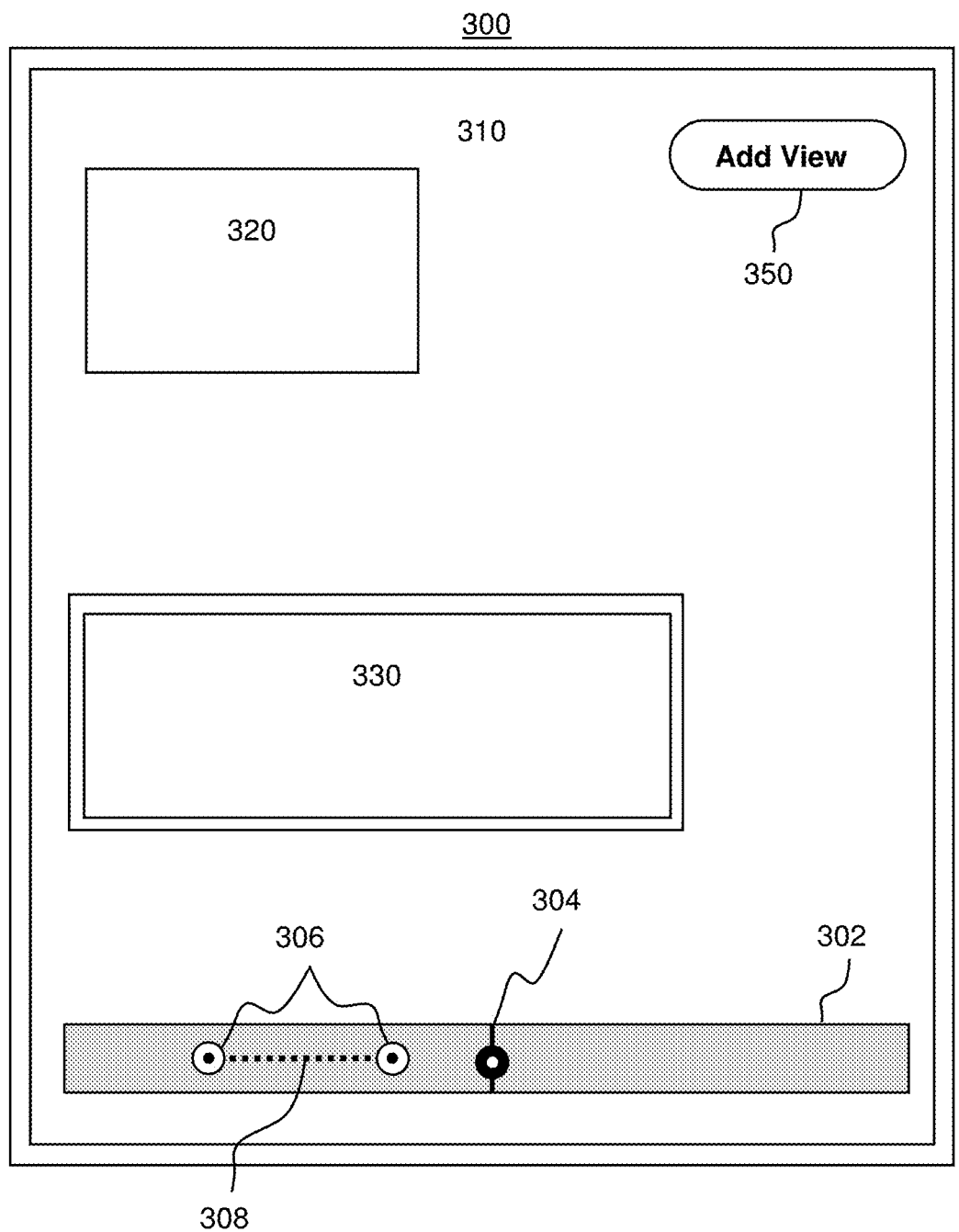
FIG. 3C illustrates an example view of a graphical user interface.

FIGS. 3A, 3B, and 3C illustrate example views of a graphical user interface 300. The views of the graphical user interface 300 in FIGS. 3A, 3B, and 3C are provided merely as examples, and the arrangement and visual aspects of the graphical user interface may vary depending on the implementation. In some implementations, the graphical user interface may include additional features and/or alternative features. In some implementations, the graphical user interface may not include features shown in FIGS. 3A, 3B, and/or 3C. Other graphical user interfaces are contemplated.

Referring to FIG. 3A, the graphical user interface 300 may include a display section 310. The display section 310 may refer to a space within the graphical user interface 300 that includes presentation of visual content. The display section 310 may include presentation of visual content of a video. The display section 310 may include presentation of a punchout of the visual content. The display section 310 may include a full-view punchout of the visual content. The full-view punchout of the visual content may refer to a punchout within the graphical user interface that is larger than other punchouts within the graphical user interface. The full-view punchout of the visual content may refer to a punchout that fills the visual content presentation space (the display section 310) within the graphical user interface. The full-view punchout of the visual content may include a punchout that is maximized within the display section 310. The graphical user interface 300 may include a single full-view punchout of the visual content.

The graphical user interface 300 may include a timeline element 302. The timeline element 302 may include a single timeline representation of the progress length of the video being presented. The length of the single timeline representation/the timeline element 302 may represent the entire progress length of the video or a portion of the progress length of the video. A user may interact with the single timeline representation within the timeline element 302 to see different parts of the video. For example, a user may drag the single timeline representation left or right within the timeline element 302 to see different moments of the video.

The graphical user interface 300 may include a framing element 304. The framing element 304 may visually represent current play position for the video. The current moment of the video that is presented within the graphical user interface 300 may correspond to the moment that is marked by the framing element 304. The framing element 304 may be accompanied by information on the current play position for the video. For example, the time position (e.g., minute:second) of the video that is marked by the framing element 304 may be presented with the framing element 304 (e.g., below/above the framing element 304). The framing element 304 may be positioned/fixed at the middle of the timeline element 302/the single timeline representation. The framing element 304 may not move when the single timeline representation moves within the timeline element 302.

The framing element 304 may enable setting of framing of the visual content. The framing of the visual content may determine positioning of a viewing window within the field of view of the visual content at a corresponding moment within the progress length. A user may set/specify the framing of the visual content for the moment marked by the framing element 304 by interacting with the framing element 304. Framing of the visual content current presented within the display section 310 (e.g., viewing direction, viewing size, viewing rotation, viewing projection) may be saved as the framing for the moment marked by the framing element 304. The spatial part of the visual content displayed within the display section 310 may be set as framing of the visual content at the marked moment based on user interaction with the framing element 304.

A user may interact with the graphical user interface to change how the visual content is framed within the display section 310. For example, a user may position the viewing window to see, at the marked moment within the progress length of the video content, a particular spatial part of the visual content by selecting one or more of viewing direction, viewing size, viewing rotation, and/or viewing projection. For instance, a user may drag a finger within the display section to change the viewing direction, use pinching of multiple fingers (e.g., pull two fingers closer together, push two fingers apart) to change the viewing size (zoom), rotate a finger around another finger to change the viewing rotation (tilt), and/or otherwise interact with the graphical user interface to change the framing of the visual content within the display section. The graphical user interface 300 may provide other options for a user to change framing of visual content. When the user interacts with (e.g., pushes, clicks) the framing element 304, framing specified for the punchout presented within the display section 310 may be saved to determine positioning of a single viewing windows for the visual content for the marked moment.

The graphical user interface 300 may include framing indictors 306, 308 to represent framing of the visual content. The framing indicators 306, 308 may represent framing of the visual content within the punchout presented within the display section 310. The framing indicators 306 may represent setting of framing at different moments within the progress length of the video (framing set indicators). Locations of the framing indicators 306 along the timeline element 302/single timeline representation may visually convey information on when two different framing have been set within the progress length of the video.

The framing indicators 308 may represent changes in positioning of the viewing window within the progress length of the video (framing change indicators). The framing indicators 308 may be presented between two surrounding framing set indicators. The framing indicators 308 between two adjust framing set indicators may visually represent that the positioning of the viewing window for the moments marked by the framing indicators 308 are automatically controlled based on two framing represented by the two surrounding framing set indicators. For example, two surrounding framing may include different framing of the visual content (e.g., different viewing direction, different viewing size, different viewing rotation, different viewing projection), and the framing of the visual content may automatically change from one framing into the other framing.

The graphical user interface 300 may include an add view element 350. The add view element 350 may enable a new/additional view of the visual content to be added to the graphical user interface 300/the display section 310. A user may interaction with the add view element 350 to add a new/additional punchout of the visual content to be added to the graphical user interface 300/the display section 310. While FIG. 3A shows a single add view element, this is merely as an example and is not meant to be limiting. In some implementations, the graphical user interface 300 may include multiple add view elements. Different add view elements may be included to enable a user to add different types of new/additional view/punchout of the visual content (e.g., an add view element to add a 1:1 punchout, an add view element to add a 16:9 punchout).

FIG. 3B shows an example view of the graphical user interface 300 in which a punchout has been added to the graphical user interface 300/the display section 310. For example, a user may have interacted with the add view element 350. Responsive to user interaction with the add view element 350, a mini-view punchout 320 may be added to the graphical user interface 300/the display section 310. The mini-view punchout 320 may be presented within the display section 310. The mini-view punchout 320 may be presented in front of the full-view punchout of the visual content within the display section 310. The mini-view punchout 320 may provide a picture-in-picture view of the same video being presented within the display section 310. The mini-view punchout 320 may provide the same or different views of the same video. For example, the mini-view punchout 320 may be used to present different spatial parts of the video than is shown in the full-view punchout of the visual content within the display section 310.

A user may select either the full-view punchout of the visual content within the display section 310 or the mini-view punchout 320. The different punchouts may be selected to set/change the framing of the visual content for the corresponding viewing window. For example, a user may select the full-view punchout of the visual content within the display section 310 and interact with the graphical user interface 300 to set/change how the viewing window for the full-view punchout is positioned at different moments within the progress length. A user may select the mini-view punchout 320 and interact with the graphical user interface 300 to set/change how the viewing window for the mini-view punchout 320 is positioned at different moments within the progress length. In some implementations, the graphical user interface 300 may change to indicate which punchout has been selected. For example, in FIG. 3B, the mini-view punchout 320 may include a border (e.g., white border) to visually indicate that the mini-view punchout 320 has been selected. Other visual representations of the selected punchout are contemplated.

Responsive to the selection of the mini-view punchout 320, the graphical user interface 300 may change to present framing indicators for the mini-view punchout 320. Rather than presenting framing indicators for the full-view punchout (as shown in FIG. 3A), the graphical user interface 300 may present framing indicators along the single timeline representation (within the timeline element 302) that represent the single set of framing for the mini-view punchout 320. In FIG. 3B, no framing indicators may be presented because the mini-view punchout 320 does not include any framing. For instance, the mini-view punchout 320 may have been newly created without any framing. As user interact with the graphical user interface 300 to add framing for the mini-view punchout 320, the framing indicators may be added to the graphical user interface 300.

FIG. 3C shows an example view of the graphical user interface 300 in which two punchouts have been added to the graphical user interface 300/the display section 310. The graphical user interface may include the mini-view punchout 320 and a mini-view punchout 330. In FIG. 3C, the mini-view punchout 330 may be selected. Responsive to the selection of the mini-vie punchout 300, the graphical user interface 300 may present the framing indictors 306, 308 along the single timeline representation (within the timeline element 302) that represent the single set of framing for the mini-view punchout 330. In FIG. 3C, two different framing may have been set for the mini-view punchout 300, as indicated by the framing indicators 306. The framing indicator 308 may visually indicate that the positioning of the viewing window is determined by surrounding framing.

As shown in FIGS. 3A, 3B, and 3C, a graphical user interface may presentation of one or multiple viewing windows as one or more punchouts of the visual content. For example, a graphical user interface may include a single full-view punchout of the visual content, one or more mini-view punchouts of the visual content, and/or other punchouts of the visual content. In some implementations, size, shape, and/or position of the mini-view punchout(s) of the visual content within the graphical user interface may be adjustable within the graphical user interface. The size, the shape, and/or the position of the punchouts may modified based on user interaction with the punchouts. For example, a user may interact with a mini-view punchout to change the size, shape, and/or position of the mini-view punchout within the graphical user interface. For example, a user may interact with a punchout (e.g., drag the edge) to make the punchout larger/smaller and/or change the dimension of the punchout. A user may interact with a punchout (e.g., click and drag) to change where the punchout is presented within the graphical user interface. The size, shape, and position of a mini-view punchout within the graphical user interface may determine the size, shape, and position of a mini-view punchout during playback of the video. Thus, a user may change how a mini-view punchout is placed within the graphical user interface to control how the particular mini-view punchout will be shown in the video playback.

Use of a single timeline element/single timeline representation of the progress length of the video for multiple punchouts enables the graphical user interface to be less cluttered. The single timeline element/single timeline representation enables space within the graphical user interface to be used more efficiently than having separate timeline elements/separate timeline representations for separate punchouts. Use of the single timeline element/single timeline representation enables numerous punchouts to be added to the graphical user interface without having multiple timeline elements/multiple timeline representations. For example, there is no need to grow the timeline elements/timeline representations vertically (stacked on top of each other) as new punchouts are added. A user can see, set, and/or change framing of visual content for a specific viewing window by selecting the corresponding punchout within the graphical user interface.

In some implementations, individual sets of framing of the visual content for different viewing window may be independent of each other such that one set of framing for one viewing window is independent of another set of framing for another viewing window. That is, framing of visual content for one viewing window/punchout may not have any effect on framing of visual content for another viewing window/punchout.

In some implementations, at least one set of framing may be dependent on another set of framing such that one set of framing for one viewing window is dependent on another set of framing for another viewing window. That is, framing of visual content for one viewing window/punchout may have one or more effects on framing of visual content for another viewing window/punchout. For example, one or more of the viewing direction, the viewing size, the viewing rotation, the viewing projection for a viewing window may be dependent on the viewing direction, the viewing size, the viewing rotation, the viewing projection for another viewing window. For instance, a change in the viewing direction for one viewing window may automatically change the viewing direction for another viewing window. The relationship between the viewing windows may include parallel relationship (e.g., same change in the viewing direction, the viewing size, the viewing rotation, and/or the viewing projection), inverse relationship (e.g., opposition change in the viewing direction, the viewing size, the viewing rotation, and/or the viewing projection), and/or other relationship.

In some implementations, positioning of an individual viewing window for the visual content may be changed based on movement of the visual content within a corresponding punchout of the visual content within the graphical user interface and/or other information. For example, one or more of the viewing direction, the viewing size, the viewing rotation, the viewing projection for a viewing window corresponding to a punchout may be automatically changed based on movement of the visual content within the punchout. Movement of the visual content within the punchout may refer to movement of the entire spatial part of the visual content within the punchout (e.g., movement of the scene within the punchout) or movement of a particular part of the visual content within the punchout (e.g., movement of an object within the punchout). For example, the viewing direction, the viewing rotation, and/or the viewing size of the viewing window may automatically change to track a person/thing depicted within the punchout. Other changes in the positioning of the viewing window based on movement of visual content are contemplated.

In some implementations, the positioning of an individual viewing window may be changed based on change in positioning of the corresponding punchout within the graphical user interface. For example, one or more of the viewing direction, the viewing size, the viewing rotation, the viewing projection for a viewing window corresponding to a punchout may be automatically changed based on change in where the punchout is placed within the graphical user interface. For instance, the viewing direction of the viewing window may change based on change in position of the punchout within the graphical user interface (e.g., moving the viewing direction to up, down, right, or left based on the punchout being moved up, down, right, or left within the graphical user interface).

In some implementations, the positioning of an individual punchout within the graphical user interface may be changed based on change in positioning of the corresponding viewing window. For example, where the punchout is placed within the graphical user interface may be automatically changed based on change in one or more of the viewing direction, the viewing size, the viewing rotation, the viewing projection for the corresponding viewing window. For instance, the punchout may be moved within the graphical user interface based on change in the viewing direction of the viewing window (e.g., moving the punchout up, down, right, or left within the graphical user interface based on the viewing direction being moved up, down, right, or left within the visual content).

In some implementations, the positioning of separate viewing windows for the visual content may be exportable as separate framing tracks for the visual content. A framing track for the visual content may include information on framing for a viewing window. Different framing tracks for the visual content may include information on framing for different viewing windows. For example, individual framing track may include information on one or more of the viewing direction, the viewing size, the viewing rotation, the viewing projection for a viewing window. The framing track(s) may be used to generate a playback of the visual content. The framing track(s) may be used to generate a playback of the visual content with one or more punchouts. Multiple framing tracks may be used in a single playback to include multiple punchouts of the visual content (e.g., render video playback with multiple punchouts at once, such as a single full-view punchout of the visual content and one or more mini-view punchouts). A single framing track may be used in a single playback to include a single punchout of the visual content (e.g., render video playback of a single punchout; render separately video playbacks of separate punchouts).

In some implementations, playback of multiple punchouts of the visual content may be automatically synchronized based on use of the video as a single video source. Different views of the video presented within different punchouts may be synchronized so that the graphical user interface provides synchronized views of different spatial parts of the video. Multiple synchronized perspectives of the video may be shown within the graphical user interface.

Multiple punchouts of the video may be synchronized based on origination of the separate punchouts from the same video. Multiple punchout that are presented within the graphical user interface may originate from a single source video, and thus the multiple punchouts may be synchronized without any need for processing/analysis to synchronize different punchouts. For example, because multiple punchouts originate from the same video, there is no need to analyze different punchouts to identify moments in different punch outs that correspond to the same time points and adjust punchout playback to match same time points.

Multiple punchouts of the video being synchronized may include separate views of the video presented within different punchouts being time-synchronized. Separate views of the video being time-synchronized may include the separate views including the same temporal parts of the video at the same time. Separate views of the video being time-synchronized may include the separate views including the same time points of the video (e.g., all views presenting different spatial parts of the video at 1:00 minute mark).

Multiple punchouts of the video being synchronized may include separate views of the video presented within different punchouts being frame-synchronized. Separate views of the video being frame-synchronized may include the separate views including spatial parts of the same video frame at the same time. Separate views of the video being frame-synchronized may include the separate views originating from the same source video frame of the video (e.g., all views presenting different spatial parts of the 100th video frame of the video).

Figure 4A:
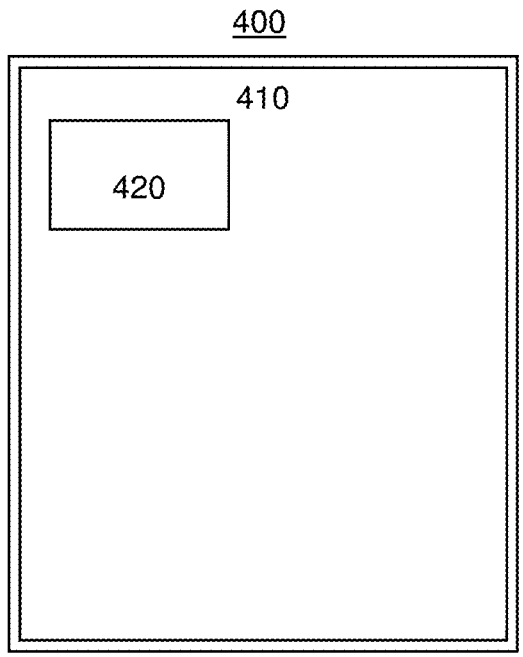
FIG. 4A illustrates an example presentation of a video.
Figure 4B:
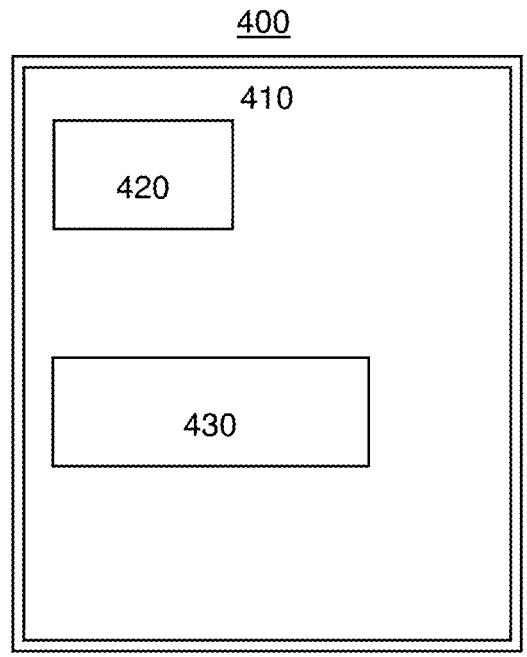
FIG. 4B illustrates an example presentation of a video.
Figure 4C:
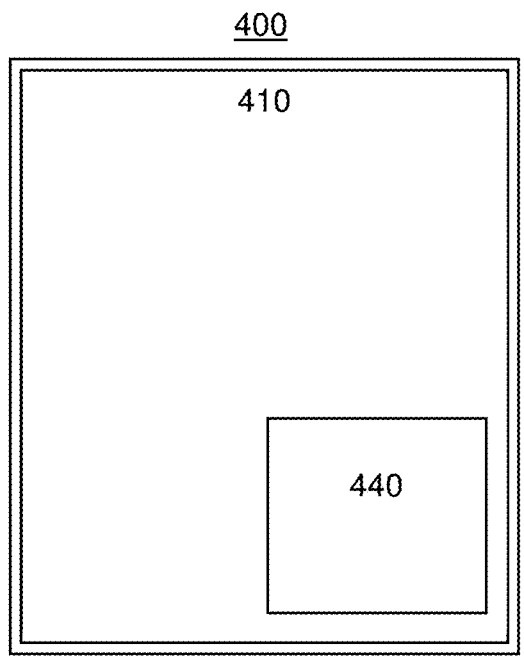
FIG. 4C illustrates an example presentation of a video.

FIGS. 4A, 4B, and 4C illustrates example presentations of a video. Multiple punchouts of the video may be used to generate presentation of the video that include multiple synchronized views of the same video. The presentation of the video shown in FIGS. 3A, 3B, and 3C are provided merely as examples, and the arrangement of punchouts shown are not meant to be limitation. Other presentations of a video are contemplated.

The presentation of the video may be generated for current presentation or future presentation. The presentation may be generated as a single video file or multiple video files. For example, a video file may include encoding of multiple punch outs of the video. As another example, encoding of separate punchouts of the video may be stored in separate video files.

The presentation of the video shown in FIGS. 4A, 4B, and 4C may show changes in the presentation of the video at different moments within the progress length of the video. For example, in FIG. 4A, a graphical user interface 400 may include presentation of a full-view punchout 410 and a mini-view punchout 420 of the visual content. The presentation of the video shown in FIG. 4A may include playback of a particular moment in the progress length of the video.

The presentation of the video shown in FIG. 4B may include playback of a later moment (later than the presentation shown in FIG. 4A) in the progress length of the video. In FIG. 4B, the graphical user interface 400 may include a new mini-view punchout of the visual content. In addition to the full-view punchout 410 and a mini-view punchout 420 of the visual content, the graphical user interface may include a mini-view punchout 430 of the visual content. That is, as the playback of the video progresses, a new punchout of the video may be added to the presentation.

The presentation of the video shown in FIG. 4C may include playback of a later moment (later than the presentation shown in FIG. 4B) in the progress length of the video. In FIG. 4C, the graphical user interface 400 may include a different arrangement of punchouts of the visual content. The graphical user interface may include the full-view punchout 410 and a mini-view punchout 440 of the visual content. The mini-view punchout 440 may be a new punchout. For example, the mini-view punchouts 420, 430 may have disappeared from the presentation and the mini-view punchout 440 may be added to the presentation. The mini-view punchout 440 may be a changed punchout. For example, one of the mini-view punchouts 420, 430 may have disappeared from the presentation and the other of the mini-view punchouts 420, 430 may have changed in shape and location to become the mini-view punchout 430. The appearance, change, and/or disappearance of punchouts in the graphical user interface may be controlled by user interaction with a graphical user interface (e.g., the graphical user interface 300) to set the number and location of the punchouts. The spatial parts of the visual content presented within punchouts may be controlled by user interaction with a graphical user interface (e.g., the graphical user interface 300) to set framing for the viewing windows corresponding to different punchouts.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

While the disclosure has been described above using different figures, one or more features/functionalities described with respect to one figure is not limited to the one figure and may be applied to other aspects of the disclosure. For example, one or more features/functionalities described with respect to FIG. 1 may be applied may be applied to other aspects of the disclosure (e.g., as described with respect with other figures).

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
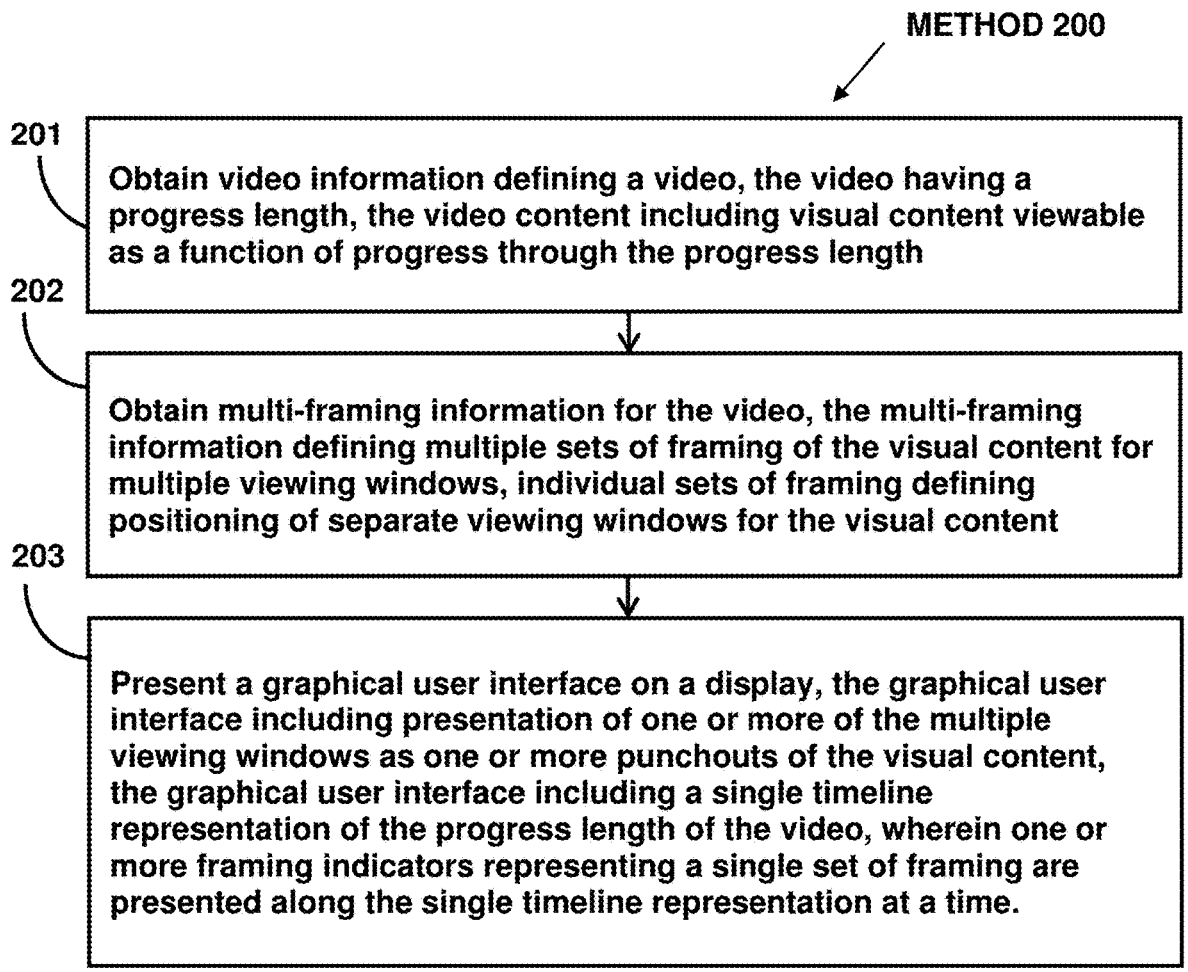
FIG. 2 illustrates a method for presenting multiple views of videos.

FIG. 2 illustrates method 200 for presenting multiple views of videos. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video. The video may have a progress length. The video may include visual content viewable as a function of progress through the progress length. In some implementations, operation 201 may be performed by a processor component the same as or similar to the video component 102 (Shown in FIG. 1 and described herein).

At operation 202, multi-framing information may be obtained. The multi-framing information for the video may define multiple sets of framing of the visual content for multiple viewing windows. Separate sets of framing may determine positioning of separate viewing windows for the visual content. The multiple sets of framing may include a first set of framing, a second set of framing, and/or other sets of framing. The first set of framing may determine positioning of a first viewing window for the visual content, the second set of framing may determine positioning of a second viewing window for the visual content, and/or other sets of framing may determine positioning of other viewing widows for the visual content. In some implementations, operation 202 may be performed by a processor component the same as or similar to the multi-framing component 104 (Shown in FIG. 1 and described herein).

At operation 203, presentation of a graphical user interface on one or more electronic displays may be effectuated. The graphical user interface may include presentation of one or more of the multiple viewing windows as one or more punchouts of the visual content. The graphical user interface may include a single timeline representation of the progress length of the video. Framing indicators representing different sets of framing may be presented along the single timeline representation at different times. In some implementations, operation 203 may be performed by a processor component the same as or similar to the graphical user interface component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting multiple views of videos, the system comprising:
one or more physical processors configured by machine-readable instructions to:
obtain video content, the video content including visual content;
obtain multiple sets of framing of the visual content for multiple viewing windows, separate sets of framing determining positioning of separate viewing windows for the visual content, wherein the multiple sets of framing include a first set of framing and a second set of framing, the first set of framing determining positioning of a first viewing window for the visual content and the second set of framing determining positioning of a second viewing window for the visual content; and
effectuate presentation of a graphical user interface on an electronic display, the graphical user interface including presentation of one or more of the multiple viewing windows as one or more punchouts of the visual content, the one or more punchouts of the visual content selectable within the graphical user interface, the graphical user interface including a single timeline representation of the video content, wherein framing indicators representing different sets of framing are presented along the single timeline representation at different times, the framing indicators representing a single set of framing for a selected punchout of the visual content.

2. The system of claim 1, wherein:
the one or more punchouts of the visual content include a single full-view punchout of the visual content and one or more mini-view punchouts of the visual content; and
size, shape, and/or position of the one or more mini-view punchouts of the visual content are adjustable within the graphical user interface.

3. A system for presenting multiple views of videos, the system comprising:
one or more physical processors configured by machine-readable instructions to:
obtain video content, the video content including visual content;
obtain multiple sets of framing of the visual content for multiple viewing windows, separate sets of framing determining positioning of separate viewing windows for the visual content, wherein the multiple sets of framing include a first set of framing and a second set of framing, the first set of framing determining positioning of a first viewing window for the visual content and the second set of framing determining positioning of a second viewing window for the visual content; and
effectuate presentation of a graphical user interface on an electronic display, the graphical user interface including presentation of one or more of the multiple viewing windows as one or more punchouts of the visual content, the graphical user interface including a single timeline representation of the video content, wherein framing indicators representing different sets of framing are presented along the single timeline representation at different times.

4. The system of claim 3, wherein:
the one or more punchouts of the visual content are selectable within the graphical user interface; and
the framing indicators represent a single set of framing for a selected punchout of the visual content.

5. The system of claim 4, wherein the one or more punchouts of the visual content include a single full-view punchout of the visual content and one or more mini-view punchouts of the visual content.

6. The system of claim 5, wherein size, shape, and/or position of the one or more mini-view punchouts of the visual content are adjustable within the graphical user interface.

7. The system of claim 3, wherein individual sets of framing of the visual content are independent of each other such that the second set of framing is independent of the first set of framing.

8. The system of claim 3, wherein at least one of the multiple sets of framing is dependent on another of the multiple sets of framing such that the second set of framing is dependent on the first set of framing.

9. The system of claim 3, wherein positioning of an individual viewing window for the visual content is changed based on movement of the visual content within a corresponding punchout of the visual content within the graphical user interface.

10. The system of claim 3, wherein the video content includes the visual content of multiple videos.

11. The system of claim 3, wherein the video content includes the visual content of a single video.

12. A method for presenting multiple views of videos, the method performed by a computing system including one or more processors, the method comprising:
obtaining, by the computing system, video content, the video content including visual content;
obtaining, by the computing system, multiple sets of framing of the visual content for multiple viewing windows, separate sets of framing determining positioning of separate viewing windows for the visual content, wherein the multiple sets of framing include a first set of framing and a second set of framing, the first set of framing determining positioning of a first viewing window for the visual content and the second set of framing determining positioning of a second viewing window for the visual content; and
effectuating, by the computing system, presentation of a graphical user interface on an electronic display, the graphical user interface including presentation of one or more of the multiple viewing windows as one or more punchouts of the visual content, the graphical user interface including a single timeline representation of the video content, wherein framing indicators representing different sets of framing are presented along the single timeline representation at different times.

13. The method of claim 12, wherein:
the one or more punchouts of the visual content are selectable within the graphical user interface;
the framing indicators represent a single set of framing for a selected punchout of the visual content.

14. The method of claim 13, wherein the one or more punchouts of the visual content include a single full-view punchout of the visual content and one or more mini-view punchouts of the visual content.

15. The method of claim 14, wherein size, shape, and/or position of the one or more mini-view punchouts of the visual content are adjustable within the graphical user interface.

16. The method of claim 12, wherein individual sets of framing of the visual content are independent of each other such that the second set of framing is independent of the first set of framing.

17. The method of claim 12, wherein at least one of the multiple sets of framing is dependent on another of the multiple sets of framing such that the second set of framing is dependent on the first set of framing.

18. The method of claim 12, wherein positioning of an individual viewing window for the visual content is changed based on movement of the visual content within a corresponding punchout of the visual content within the graphical user interface.

19. The method of claim 12, wherein the video content includes the visual content of multiple videos.

20. The method of claim 12, wherein the video content includes the visual content of a single video.

* * * * *